United States Patent
Khoshnevis (10) Patent No.: US 8,308,470 B2
(45) Date of Patent: Nov. 13, 2012

(54) EXTRUSION OF CEMENTITIOUS MATERIAL WITH DIFFERENT CURING RATES

(75) Inventor: Behrokh Khoshnevis, Marina del Rey, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 12/952,916

(22) Filed: Nov. 23, 2010

(65) Prior Publication Data

US 2011/0076350 A1 Mar. 31, 2011

Related U.S. Application Data

(63) Continuation of application No. 11/556,027, filed on Nov. 2, 2006, now Pat. No. 7,841,851.

(60) Provisional application No. 60/733,451, filed on Nov. 4, 2005, provisional application No. 60/820,046, filed on Jul. 21, 2006, provisional application No. 60/864,060, filed on Nov. 2, 2006.

(51) Int. Cl.
  *B28B 17/02* (2006.01)
(52) U.S. Cl. ......... 425/375; 264/113; 264/308; 264/401
(58) Field of Classification Search ................. 425/375; 264/113, 308, 401
  See application file for complete search history.

(56) References Cited

U.S. PATENT DOCUMENTS

| 984,517 A | 2/1911 | Rollinger |
| 1,381,864 A | 6/1921 | Evans |

(Continued)

FOREIGN PATENT DOCUMENTS

AT 385550 B 4/1988

(Continued)

OTHER PUBLICATIONS

Khoshnevis, B. et al. 2002. Automated Construction Using Contour Crafting: Applications on Earth and Beyond. International Symposium on Automation and Robotics in Construction, 19th (ISARC). Proceedings. National Institute of Standards and Technology, Gaithersburg, Maryland. Sep. 23-25, 2002, pp. 489-494.

(Continued)

*Primary Examiner* — Joseph Del Sole
*Assistant Examiner* — Nahida Sultana
(74) *Attorney, Agent, or Firm* — McDermott Will & Emery LLP (57) ABSTRACT

A cementitious material delivery system comprising may include a flow divider, a first and second chemical agent, a first and second mixer, and a nozzle. The flow divider may be configured to divide a flow of cementitious material into a first stream and a second stream that is separate from the first stream. The first chemical agent may cure the cementitious material at a first rate when mixed with the cementitious material. A first mixer may be configured to mix the first chemical agent with the first steam of cementitious material to produce a first mixed stream of cementitious material. A second chemical agent may be configured to cure the cementitious material at a second rate when mixed with the cementitious material which is faster than the first rate. A second mixer separate may be configured to mix the second chemical agent with the second steam of cementitious material to produce a second mixed stream of cementitious material. A nozzle may be configured to extrude the first mixed stream of cementitious material and the second mixed stream of cementitious material separate from the first mixed stream of cementitious material.

20 Claims, 5 Drawing Sheets

U.S. PATENT DOCUMENTS

| | | | |
|---|---|---|---|
| 1,578,511 A | 3/1926 | Gladwin | |
| 2,046,071 A | 6/1936 | Harding | |
| 3,221,457 A | 12/1965 | Vevoda | |
| 3,464,676 A | 9/1969 | Cox | |
| 3,562,991 A | 2/1971 | Kustusch | |
| 3,966,533 A | 6/1976 | Goldsworthy et al. | |
| 3,997,147 A | 12/1976 | Scherping | |
| 4,066,723 A | 1/1978 | King et al. | |
| 4,115,138 A | 9/1978 | Nudelman et al. | |
| 4,298,288 A | 11/1981 | Weisbrod | |
| 4,440,578 A | 4/1984 | Wadia | |
| 4,588,443 A | 5/1986 | Bache | |
| 4,833,855 A | 5/1989 | Winter, IV | |
| 4,850,382 A | 7/1989 | Williams | |
| 4,919,597 A | 4/1990 | Kistner | |
| 4,936,111 A | 6/1990 | Wilkinson | |
| 5,059,266 A | 10/1991 | Yamane et al. | |
| 5,387,282 A | 2/1995 | Jakel | |
| 5,387,283 A | 2/1995 | Kirkpatrick et al. | |
| 5,529,471 A | 6/1996 | Khoshevis | |
| 5,617,515 A | 4/1997 | MacLaren et al. | |
| 5,633,021 A | 5/1997 | Brown et al. | |
| 5,656,230 A | 8/1997 | Khoshevis | |
| 5,664,382 A | 9/1997 | Melnick et al. | |
| 5,728,209 A | 3/1998 | Bury et al. | |
| 5,749,196 A | 5/1998 | Bangma | |
| 5,924,598 A | 7/1999 | Bradshaw | |
| 5,935,313 A | 8/1999 | Ficinski | |
| 6,001,181 A | 12/1999 | Bullen | |
| 6,019,459 A * | 2/2000 | Pew et al. | 347/85 |
| 6,089,837 A | 7/2000 | Cornell | |
| 6,103,161 A | 8/2000 | Lopez | |
| 6,170,220 B1 | 1/2001 | Moore, Jr. | |
| 6,280,784 B1 | 8/2001 | Yang et al. | |
| 6,363,683 B1 | 4/2002 | Moore, Jr. | |
| 6,423,261 B1 | 7/2002 | Joseph et al. | |
| 6,589,654 B1 | 7/2003 | Arcaini et al. | |
| 6,662,516 B2 | 12/2003 | Vandehey et al. | |
| 6,672,848 B2 | 1/2004 | Yang | |
| 6,957,604 B1 | 10/2005 | Tiedemann | |
| 7,153,454 B2 | 12/2006 | Khoshnevis | |
| 7,452,196 B2 | 11/2008 | Khoshnevis | |
| 7,641,461 B2 | 1/2010 | Khoshnevis | |
| 7,658,794 B2 | 2/2010 | Gleeson et al. | |
| 7,814,937 B2 | 10/2010 | Khoshnevis | |
| 7,837,378 B2 | 11/2010 | Khoshnevis | |
| 7,841,849 B2 | 11/2010 | Khoshnevis | |
| 7,841,851 B2 | 11/2010 | Khoshnevis | |
| 2003/0004599 A1 | 1/2003 | Herbak | |
| 2003/0202418 A1* | 10/2003 | Scartezina | 366/44 |
| 2004/0099983 A1 | 5/2004 | Dirscherl | |
| 2004/0125690 A1* | 7/2004 | Sentmanat | 366/268 |
| 2004/0164436 A1* | 8/2004 | Khoshnevis | 264/31 |
| 2005/0051329 A1 | 3/2005 | Blaisdell | |
| 2005/0196482 A1 | 9/2005 | Khoshnevis | |
| 2005/0196484 A1 | 9/2005 | Khoshnevis | |
| 2005/0250642 A1* | 11/2005 | Stamires et al. | 502/64 |
| 2006/0061007 A1* | 3/2006 | Chen et al. | 264/211.23 |
| 2007/0138678 A1 | 6/2007 | Khoshnevis | |
| 2007/0181519 A1 | 8/2007 | Khoshnevis | |
| 2007/0286674 A1 | 12/2007 | Khoshnevis | |
| 2008/0017663 A1 | 1/2008 | Khoshnevis | |

FOREIGN PATENT DOCUMENTS

| | | |
|---|---|---|
| DE | 2052583 A1 | 5/1972 |
| EP | 0389785 B1 | 9/1994 |
| GB | 0892994 B | 4/1986 |
| GB | 2267110 B | 11/1993 |
| GB | 2291600 A | 1/1996 |
| WO | 03086717 A2 | 10/2001 |
| WO | 0242056 B1 | 5/2002 |
| WO | 2004065707 A2 | 8/2004 |
| WO | 2007053789 A2 | 5/2007 |
| WO | 2007056353 A2 | 5/2007 |
| WO | 2008/055255 A2 | 5/2008 |

OTHER PUBLICATIONS

International Search Report, dated Sep. 28, 2007, for PCT Application Serial No. PCT/US06/43318 (Published as WO2007/053789), entitled "Material Delivery System Using Decoupling Accumulator," filed Nov. 6, 2006.

European Patent Office. Examination Report for EP Application No. 04 704 067.0 (European regional phase of WO2004/065707), entitled "Multi-Nozzle Assembly for Extrusion of Wall," Jan. 22, 2010.

Office Action, dated Aug. 30, 2011, U.S. Appl. No. 12/701,205, entitled "Dry Material Transport and Extrusion," filed Feb. 5, 2010 (continuation of U.S. Appl. No. 11/556,048, now U.S. Patent No. 7,841,849).

Perry's Chemical Engineers' Handbook (7th Edition), 1997, McGraw-Hil, 17-26, 27 and 21-31.

European Patent Office. Supplemental Search Report for EP Application No. 04 704 067.0, entitled "Multi-Nozzle Assembly for Extrusion of Wall," mailed Aug. 3, 2009.

International Search Report and Written Opinion of the International Searching Authority (ISA/US), mailed May 2, 2007, for PCT Application No. PCT/US06/43316, entitled "Dry Material Transport and Extrusion," published as WO/2007/056353 (published May 18, 2007,as WO/2007/053789).

U.S. Appl. No. 12/701,205, Admission of Prior Art, disclosed May 20, 2010.

Extended European Search Report, dated Mar. 9, 2011, for European Application No. 07868646.6, entitled "Metering and Pumping Devices," based on PCT/US2007/083373 (published May 8, 2008 as WO/2008/055255A2).

Extended European Search Report, dated Dec. 20, 2011, for European Application No. 06847468.3, entitled "Material Delivery System Using Decoupling Accumulator," based on PCT/US2006/043318.

Office Action (final), dated Feb. 24, 2012, U.S. Appl. No. 12/701,205, entitled "Dry Material Transport and Extrusion," filed Feb. 5, 2010 (continuation of U.S. Appl. No. 11/556,048, now U.S. Patent No. 7,841,849).

* cited by examiner

EXTRUSION OF CEMENTITIOUS MATERIAL WITH DIFFERENT CURING RATES

CROSS-REFERENCE TO RELATED APPLICATIONS

This application is a continuation of application Ser. No. 11/556,027, entitled "Material Delivery System Using Decoupling Accumulator," filed Nov. 2, 2006; which is based upon and claims priority to U.S. Provisional Patent Application Ser. No. 60/733,451, entitled "Material Delivery Approaches for Contour Crafting," filed Nov. 4, 2005; U.S. Provisional Patent Application Ser. No. 60/820,046, entitled "Accumulator Design for Cementitious Material Delivery," filed Jul. 21, 2006; and U.S. Provisional Patent Application Ser. No. 60/864,060 entitled "Metering and Pumping Devices," filed Nov. 2, 2006. The entire content of all of these applications is incorporated herein by reference.

This application is also related to U.S. patent application Ser. No. 10/760,963 (issued Dec. 26, 2006 as U.S. Pat. No. 7,153,454), entitled "Multi-Nozzle Assembly for Extrusion of Walls," filed Jan. 20, 2004, which claims priority to and incorporates by reference U.S. Provisional Application Ser. No. 60/441,572, entitled "Automated Construction," filed Jan. 21, 2003. This application is also related to U.S. patent application Ser. No. 11/040,401 (issued Jan. 5, 2010 as U.S. Pat. No. 7,641,461), entitled "Robotic Systems for Automated Construction," filed Jan. 21, 2005; U.S. patent application Ser. No. 11/040,602 (issued Nov. 18, 2008 as U.S. Pat. No. 7,452,196), entitled "Automated Plumbing, Wiring, and Reinforcement," filed Jan. 21, 2005, and U.S. patent application Ser. No. 11/040,518, entitled "Mixer-Extruder Assembly," filed Jan. 21, 2005 (issued Nov. 23, 2010 as U.S. Pat. No. 7,837,378), all three of which claim priority to U.S. Provisional Application Ser. No. 60/537,756, entitled "Automated Construction Using Extrusion," filed Jan. 20, 2004. This application is also related to the following U.S. Provisional Applications: Ser. No. 60/730,560, entitled "Contour Crafting Nozzle and Features for Fabrication of Hollow Structures," filed Oct. 26, 2005; Ser. No. 60/730,418, entitled "Deployable Contour Crafting Machine," filed Oct. 26, 2006; Ser. No. 60/744,483, entitled "Compliant, Low Profile, Non-Protruding and Genderless Docking System for Robotic Modules," filed Apr. 7, 2006; and Ser. No. 60/807,867, entitled "Lifting and Emptying System for Bagged Materials," filed Jul. 20, 2006. This application is also related to U.S. patent application Ser. No. 11/552,741 (issued Oct. 19, 2010 as U.S. Pat. No. 7,814,937), entitled "Deployable Contour Crafting," filed Oct. 25, 2006, and U.S. patent application Ser. No. 11/552,885, entitled "Extruded Wall with Rib-Like Interior," filed Oct. 25, 2006. The entire content of all of these applications is incorporated herein by reference.

BACKGROUND

1. Field

This application relates to material delivery and extrusion systems, including systems configured to deliver and extrude cementitious material.

2. Description of Related Art

Structures, such as buildings, may be built up, layer by layer, by extruding cementitious or other unhardened material from a nozzle moving in a controlled pattern. Examples of apparatuses and processes that may be used are set forth in the patent applications that have been incorporated by reference in the Cross-Reference to Related Applications section of this application.

The quality of the result may depend upon being able to accurately control the rate at which the cementitious or other material is extruded from the nozzle. Controlling the pressure or rate at which the material is delivered from a remote pump, however, may not be sufficient. Intervening hoses may expand or contract and gas bubbles in the material itself may compress or expand. Changes in pressure at the output of the pump, therefore, may not be immediately reflected at the nozzle.

SUMMARY

A cementitious material delivery system may include a flow divider, a first and second chemical agent, a first and second mixer, and a nozzle. The flow divider may be configured to divide a flow of cementitious material into a first stream and a second stream that is separate from the first stream. The first chemical agent may cure the cementitious material at a first rate when mixed with the cementitious material. A first mixer may be configured to mix the first chemical agent with the first steam of cementitious material to produce a first mixed stream of cementitious material. A second chemical agent may be configured to cure the cementitious material at a second rate when mixed with the cementitious material which is faster than the first rate. A second mixer separate may be configured to mix the second chemical agent with the second steam of cementitious material to produce a second mixed stream of cementitious material. A nozzle may be configured to extrude the first mixed stream of cementitious material and the second mixed stream of cementitious material separate from the first mixed stream of cementitious material.

The nozzle may have a first, second, and third outlet which are each configured to extrude cementitious material, the second outlet being between the first and the third outlets. The nozzle may be configured such that the first mixed stream of cementitious material is extruded from the second outlet, and the second mixed stream of cementitious material is extruded from the first and the third outlets.

The first and second mixers may share a common drive shaft.

A first metering device may be in series with the first stream of cementitious material configured to regulate the flow of material through the first metering device. A second metering device may be in series with the second stream of cementitious material configured to regulate the flow of material through the second metering device.

A reservoir of cementitious material may be configured to supply the flow of cementitious material to the flow divider. A decoupling accumulator device may be configured to decouple the flow of cementitious material from the reservoir of cementitious material to the flow divider.

The decoupling accumulator may be of the flow-through type which passes cementitious material on a first-in-first-out basis.

The decoupling accumulator may include a cylinder and a piston within the cylinder. A volume defined by the piston and the cylinder may function as the reservoir. The cementitious material delivery system of claim 8 wherein the decoupling accumulator includes a hollow shaft connected to the piston. The hollow shaft may have end connected to the piston and an opposite end that functions as an accumulator inlet.

The piston may have a pushing surface and an opening within the pushing surface that has an area less than the area of the surface outlined by the pushing surface.

The hollow shaft may be attached to the piston such that cementitious material may flow from the accumulator inlet through the opening in the pushing surface of the piston.

The cylinder may include an opening there through that is sized and positioned to allow cementitious material to escape from the cylinder only when the cylinder has been filled beyond a threshold amount.

The decoupling accumulator may include a detection system configured to detect when the amount of cementitious material in the reservoir reaches a first amount and when it reaches a second amount.

A pump may be configured to be activated when the detection system detects that the amount of cementitious material in the reservoir has reached the first amount and to be deactivated when the detection system detects that the amount of cementitious material in the reservoir has reached the second amount.

The detection system may include a first and second level sensor.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or that are unnecessary are also often omitted to save space or for more effective illustration. When the same numeral appears in different drawings, it is intended to refer to the same or like components or steps.

DETAILED DESCRIPTION OF ILLUSTRATIVE EMBODIMENTS

Illustrative embodiments are now discussed. Other embodiments may be used in addition or instead. Details that may be apparent or that are unnecessary are also often omitted to save space or for more effective presentation.

Figure 1:
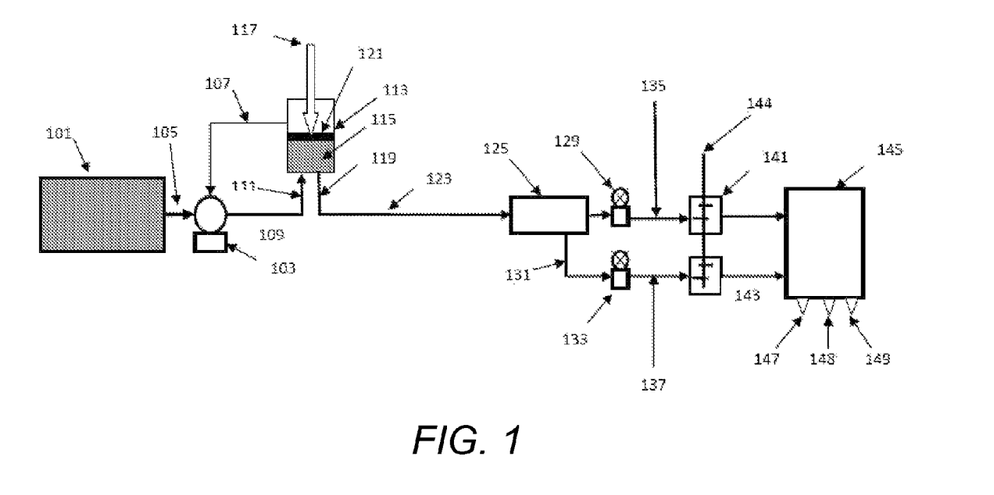
FIG. 1 illustrates a material delivery system using a decoupling accumulator.

FIG. 1 illustrates a material delivery system using a decoupling accumulator. As shown in FIG. 1, the material delivery system may include a reservoir 101. The reservoir may contain a mixture of unhardened material, such as unhardened cementitious material. The unhardened material may be treated with one or more retardant chemicals that may cause the material to cure slowly.

The reservoir 101 may be of any type. It may be of any shape, of any size, and made from any type of material. The reservoir 101 may include an internal mixer.

Material may be pumped from the reservoir 101 by a pump 103. The pump 103 may be external to the reservoir 101, as shown in FIG. 1, or may be within the reservoir 101. When outside, a tube 105, such as a flexible hose, may be connected between the reservoir 101 and the pump 103.

The operation of the pump 103 may be controlled by a control signal that may be delivered to the pump 103 over a control channel 107 or through other means. Under the control of the control signal, the pump may be configured to turn on, to turn off, and/or to operate at a controllable speed, flow rate or pressure.

Material that is pumped by the pump 103 may be delivered at an outlet 104 on the pump through a tube 109, such as a flexible hose, to an inlet 111 of a decoupling accumulator 113.

The decoupling accumulator 113 may include a reservoir 115, a pressure-applicator 117, and an outlet 119.

The reservoir 115 may be configured to store material that is delivered through the inlet 111 and to deliver stored material through the outlet 119. The pressure-applicator 117 may be configured to assert pressure on the material that is stored in the reservoir 115 and, in turn, the material that is delivered through the outlet 119. The reservoir 115 may be of any type. It may be of any shape, of any size, and made from any type of material. It may include an internal mixer.

The pressure-applicator 117 may similarly be of any type. It may be of any shape, of any size, and made from any type of material.

The pressure-applicator 117 may include a piston 121 within the reservoir 115 that is configured to create a seal between the perimeter of the piston 121 and the wall of the reservoir 115. The piston 121 may be driven downwardly by any means, such as by the weight of the piston, a weight that is placed on top of the piston, a spring, by pressure from gas such as air, or by pressure from liquid such as water. The pressure-applicator may be configured to apply a constant pressure to the material in the reservoir 115, notwithstanding changes in the amount of the material within the reservoir 115.

A detection system may be employed in connection with the decoupling accumulator 113. The detection system may be configured to detect the amount of material that is within the reservoir 115 and to generate a control signal based on this amount. This control signal may be delivered to the pump 103 over the control channel 107. The detection system may be configured to deliver a control signal to the pump 103 that turns the pump on when the level of material within the reservoir 115 is below a first threshold amount, and that turns the pump 103 off when the level of material within the reservoir 115 is above a second, larger threshold amount. One or more level-sensing switches may be used to detect the level of the material within the reservoir 115 as part of the detection system.

Material from the outlet 119 of the decoupling accumulator 113 may be channeled by a tube 123, such as a flexible hose, to a flow divider 125. The flow divider may be configured to divide the flow of material from the tube 123 into two or more separated paths. Material from a first path may be directed by a tube 127, such as a flexible hose, to a first metering device 129. Material from a second path may be directed by a tube 131, such as a flexible hose, to a second metering device 133.

The metering devices 129 and 133 may be configured to regulate the amount of material that flows through the path in which it is interposed.

A chemical agent, which may or may not be a hardening agent, may be injected in the first path of the material at a first injection point 135. Similarly, a chemical agent which may or may not be a hardening agent may be injected into the second path of material at a second injection point 137. The chemical agents that are injected into the first injection point 135 and the second injection point 137 may be different. One chemical agent may be selected to cause the material in one path to cure quickly. This quick-curing material may be extruded by a nozzle (discussed below) to quickly form two, spaced apart, outer shell walls. The other chemical agent may be selected to cause the material in another path to cure slowly and be self-leveling. The slow-curing material may be extruded by the nozzle into the space between the two, spaced apart, outer shell walls.

A mixer 141 may be used to mix the chemical agent that is injected at the first injection point 135 with the material in the first pathway. Similarly, a mixer 143 may be used to mix the chemical agent that is injected at the second injection point 137 with the material in the second pathway. The mixers may share a common drive shaft 144.

The mixed material in the first pathway and the mixed material in the second pathway may be separately delivered to a nozzle 145. The nozzle 145 may include outlets 147 and 148 from which quick-curing mixed material may be extruded to quickly create the inner and outer shell walls. The nozzle 145 may include an outlet 149 between the outlets 147 and 148 from which slow-curing mixed material may be extruded to create a self-leveling core. Examples of nozzles and processes for using them are set forth in the patent applications that are incorporated by reference in the Cross-Reference to Related Applications section of this patent application.

Although two paths and three extrusion outlets are illustrated in FIG. 1, a different number may be used instead. For example, there may be only a single path of mixed material or there may be three paths. The nozzle may have only a single outlet or it may have two or more outlets.

A computer system may be used to partially or fully automate the operation of the pump 103, the metering devices 129 and 133, the injection of curing agents at the injection points 135 and 137, the mixers 141 and 143, the movement of the nozzle 145, and/or the extrusion of materials from the nozzle 145. In the partially automated mode, the control of one or more of these devices may be done manually. In the fully automated mode, all these devices may be controlled and operated by the computer system under the control of one or more computer programs. The same computer system, or a different computer system, may also operate a gantry system that may be used to position the nozzle and/or a deployable machine that may be used to transport the nozzle, along with the gantry system, to a construction site. Examples of apparatuses and processes that may be used in association with the apparatuses and processes described in this application are set forth in the patent applications that are incorporated by reference in the Cross-Reference to Related Applications section of this patent application.

The embodiment of the decoupling accumulator 113 that is illustrated in FIG. 1 may result in some material remaining longer in the reservoir 115 than other material. For example, material at the top of the reservoir 115 may remain within the reservoir 115 longer than material at the bottom. Some material may remain within the reservoir for so long that it begins to cure.

The decoupling accumulator 113 may be configured differently to be of a flow-through type so as to pass the material that sequentially enters the accumulator inlet in substantially the same sequence through the accumulator outlet.

Figure 2:
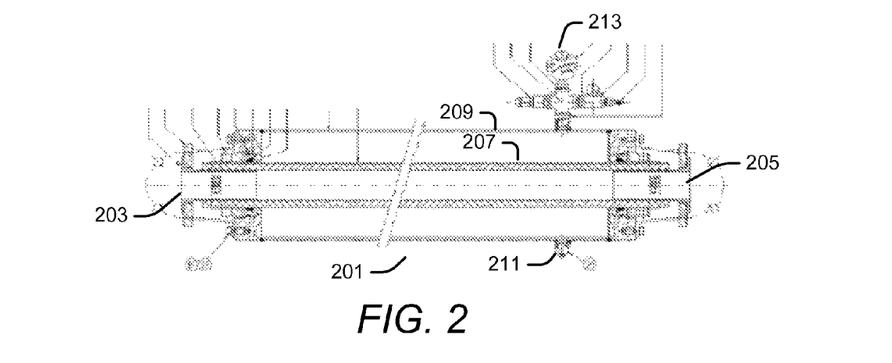
FIG. 2 is a cross-section of a flow-through, decoupling accumulator that uses a bladder.

FIG. 2 is a cross-section of a flow-through, accumulator that uses a bladder. As shown in FIG. 2, a decoupling accumulator 201 may include a material inlet 203, a material outlet 205, a compressible tube 207, such as a rubber tube, a sealed pressure chamber 209, and a control inlet 211.

In this embodiment, the interior wall of the compressible tube 207 may serve as a reservoir. The exterior wall of the compressible tube 207, the sealed pressure chamber 209, and the control inlet 211 may serve as a pressure-applicator. The amount of pressure on the material within the compressible tube 207 may be controlled by varying the amount of gas, such as air, or fluid, such as water, that is delivered through the control inlet 211. A pressure gauge 213 may be include to indicate the pressure within the sealed pressure chamber 209 and, in turn, that is applied though the compressible tube 207 to the material within it.

A detection system may be used in connection with the decoupling accumulator 201 so as to generate an on and off control signal for the pump 103. For this purpose, one or more sensors may be used to detect the amount of material within the compressible tube 207. The sensors may sense the diameter of the compressible tube 207, the air pressure in the sealed pressure chamber 209, and/or the weight of the decoupling accumulator. One or more of these measurements may be compared to a pre-determined maximum and a pre-determined minimum. When the amount goes below the minimum, the detection system may send a control signal to the pump 103 to turn on. When the amount reaches the maximum, the detection system may send a control signal to the pump 103 to turn off.

The decoupling accumulator 201 may be used in lieu of the decoupling accumulator 113 in FIG. 1.

Figure 3:
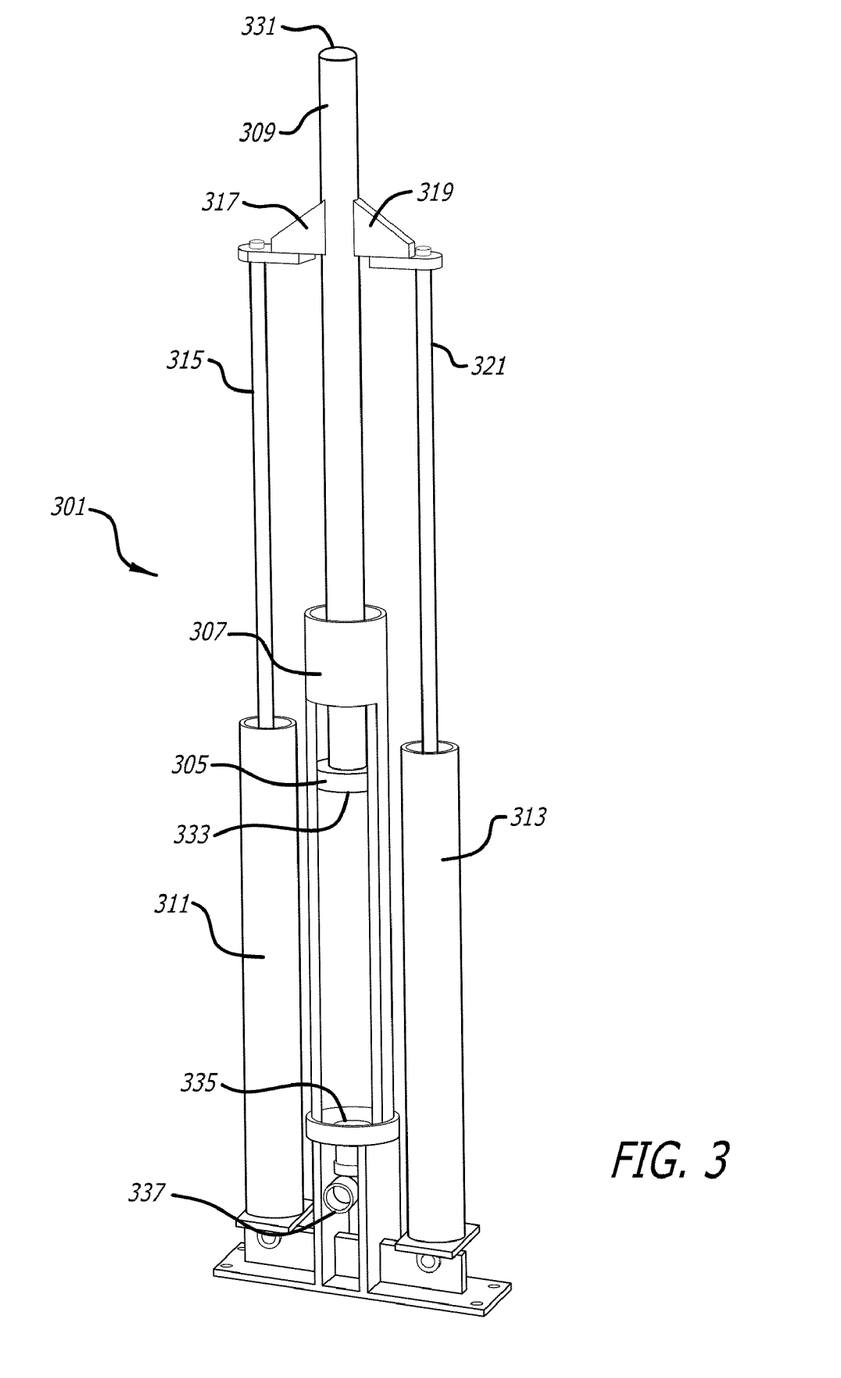
FIG. 3 is a cut-away view of a flow-through, decoupling accumulator that uses a piston shown in a raised position.

FIG. 3 is a cut-away view of a flow-through decoupling accumulator that uses a piston shown in a raised position. As shown in FIG. 3, a decoupling accumulator 301 may include a piston 305 having an under-side pushing surface 333 configured to snuggly traverse the interior of a cylinder 307. The piston may be driven by a hollow drive shaft 309. Pneumatic cylinders 311 and 313 may be configured to apply downward pressure on the hollow drive shaft 309 and, in turn, the piston 305 through linkages 315, 317, 319 and 321.

Figure 6:
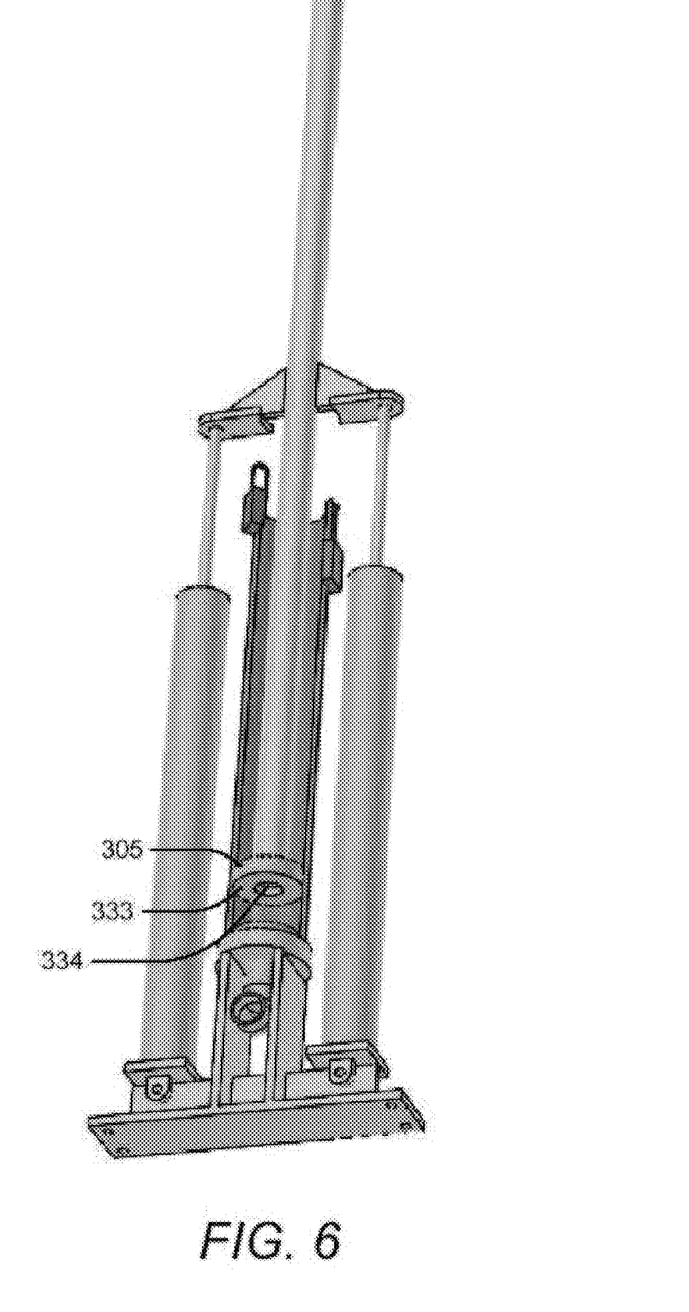
FIG. 6 is a cut-away underneath view of the flow-through, decoupling accumulator that in FIG. 3.

In operation, material from the pump 103 may be delivered to the decoupling accumulator 301 at an inlet 331 which may be the upper end of the hollow drive shaft 309. The material may flow through the hollow drive shaft 309 and through an opening in the under-side, pushing surface 333 of the piston 305. FIG. 6 is a cut-away underneath view of the flow-through, decoupling accumulator that in FIG. 3. It illustrates the opening 334 in the piston 305.

The material may fill the reservoir defined by the inner wall of the cylinder 307, the under side pushing surface 333 of the piston 305, and a rim 335 of an outlet 337. As the material fills the reservoir, the piston may rise. However, the pneumatic cylinders 311 and 313, the linkages 315, 317, 319 and 321, the hollow drive shaft 309, and the piston 305 may cooperate to function as a pressure-applicator, applying pressure to the material within the reservoir, thus urging the material out of the outlet 337.

Figure 4:
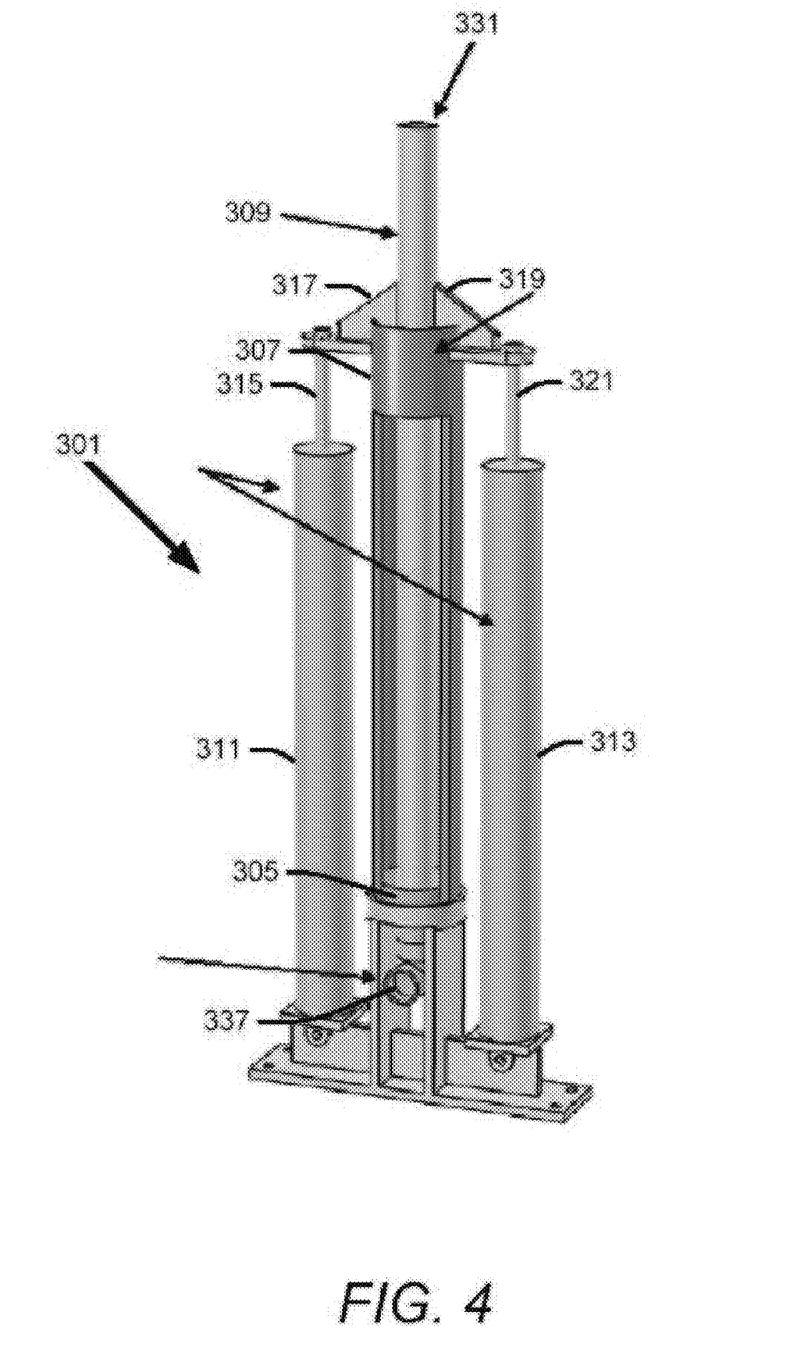
FIG. 4 is a cut-away view of the flow-through, decoupling accumulator in FIG. 3 with the piston in a lowered position.

FIG. 4 is a cut-away view of the flow-through decoupling accumulator in FIG. 3 with the piston in a lowered position. As shown in FIG. 4, the piston 305 is at the bottom of the cylinder 307.

Figure 5:
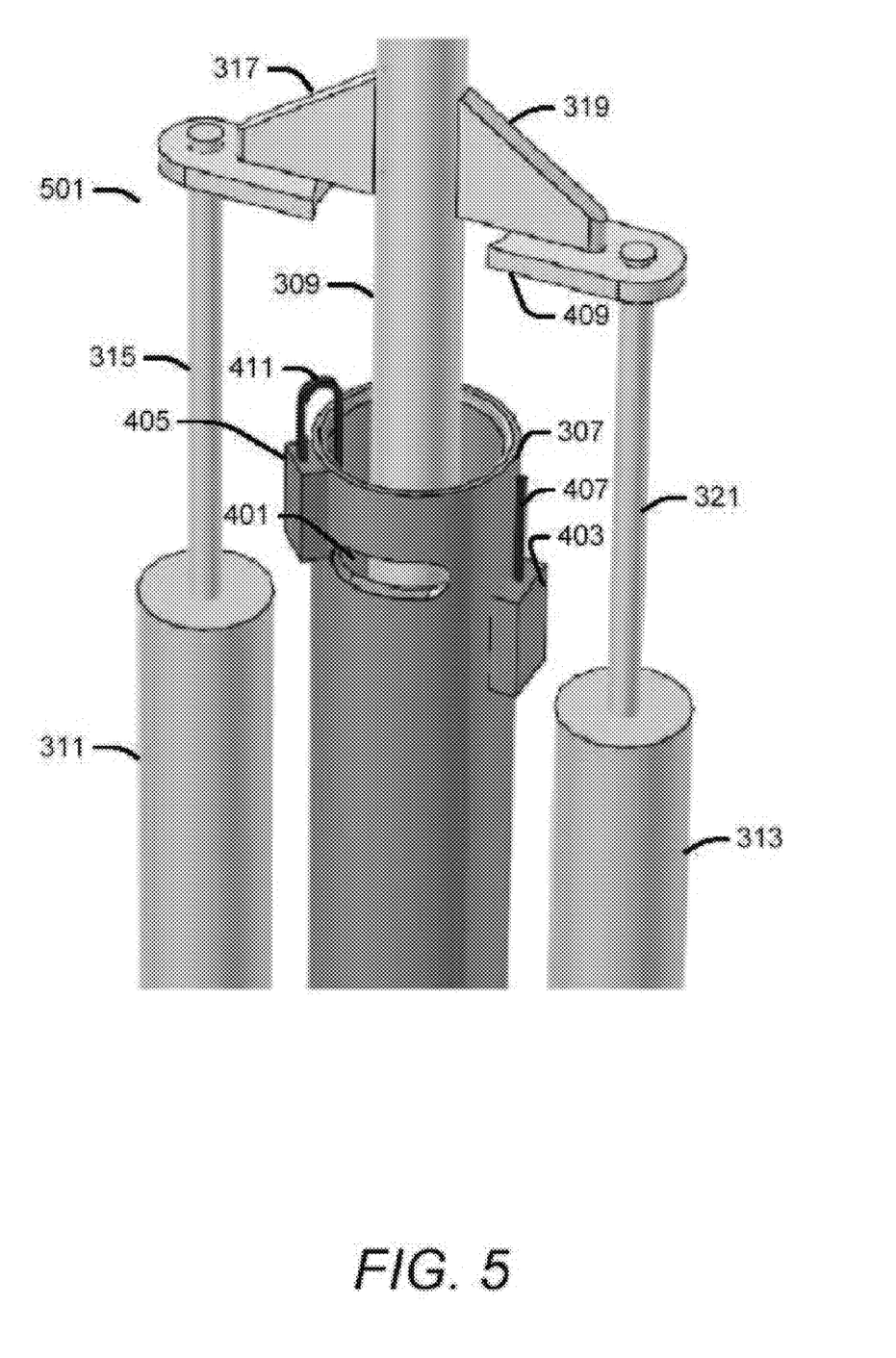
FIG. 5 illustrates the upper portion of a flow-through, decoupling accumulator of the type shown in FIGS. 3 and 4 with a detection system and overflow protection.

FIG. 5 illustrates the upper portion of a flow-through decoupling accumulator of the type shown in FIGS. 3 and 4 with a detection system and overflow protection. As shown in FIG. 5, the decoupling accumulator may have the same components as shown in FIGS. 3 and 4, except for the addition of an overflow outlet 401 near the upper end of the cylinder 307, a cylinder-empty sense switch 403, and a cylinder-full sense switch 405.

In this embodiment, the cylinder-empty sense switch 403 may have an actuation member 407 sized and positioned to contact a lower surface 409 of the linkage 319 when the piston 305 is almost at the bottom of the cylinder 307. A control signal generated by the empty sense switch 403 may be delivered to the pump 103 and cause the pump 103 to turn on, thus pumping material which will fill the reservoir within the cylinder 307.

When the piston 305 is almost at the top of the cylinder 307, but beneath the overflow outlet 401, an actuation member 411 on the cylinder-full sense switch 405 may be actuated by an upper surface of the piston 305. A control signal generated by the cylinder-full sense switch 405 may be delivered to the pump 103 and cause the pump 103 to turn off, thus stopping the reservoir within the cylinder 307 from continuing to fill.

If for any reason (such as sensor failure) the pump fails to shut off at this point, the piston 305 may continue to rise until the level of material within the cylinder 307 rises to the level of the overflow outlet 401. At this point, the material may exit from the overflow outlet 401, thus preventing the piston 305 from separating from the cylinder 307.

The decoupling accumulator 301 may be used in lieu of the decoupling accumulator 113 shown in FIG. 1.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

In short, the scope of protection is limited solely by the claims that now follow. That scope is intended to be as broad as is reasonably consistent with the language that is used in the claims and to encompass all structural and functional equivalents.

The invention claimed is:

1. A cementitious material delivery system comprising:
   a flow divider configured to divide a flow of cementitious material into a first stream and a second stream that is separate from the first stream;
   a first chemical agent which cures the cementitious material at a first rate when mixed with the cementitious material;
   a first mixer configured to mix the first chemical agent with the first stream of cementitious material to produce a first mixed stream of cementitious material;
   a second chemical agent which cures the cementitious material at a second rate when mixed with the cementitious material which is faster than the first rate;
   a second mixer separate from the first mixer and configured to mix the second chemical agent with the second stream of cementitious material to produce a second mixed stream of cementitious material; and
   a nozzle configured to extrude the first mixed stream of cementitious material and the second mixed stream of cementitious material separate from the first mixed stream of cementitious material.

2. The cementitious material delivery system of claim 1 wherein the nozzle:
   has a first, second, and third outlet which are each configured to extrude cementitious material, the second outlet being between the first and the third outlets; and
   is configured such that:
      the first mixed stream of cementitious material is extruded from the second outlet; and
      the second mixed stream of cementitious material is extruded from the first and the third outlets.

3. The cementitious material delivery system of claim 1 wherein the first and second mixers share a common drive shaft.

4. The cementitious material delivery system of claim 1 further comprising:
   a first metering device in series with the first stream of cementitious material configured to regulate the flow of material through the first metering device; and
   a second metering device in series with the second stream of cementitious material configured to regulate the flow of material through the second metering device.

5. The cementitious material delivery system of claim 1 further comprising:
   a reservoir of cementitious material configured to supply the flow of cementitious material to the flow divider; and
   a decoupling accumulator device configured to decouple the flow of cementitious material from the reservoir of cementitious material to the flow divider.

6. The cementitious material delivery system of claim 5 wherein the decoupling accumulator is of the flow-through type which passes cementitious material on a first-in-first-out basis.

7. The cementitious material delivery system of claim 6 wherein the decoupling accumulator includes a cylinder and a piston within the cylinder.

8. The cementitious material delivery system of claim 7 wherein a volume defined by the piston and the cylinder functions as the reservoir.

9. The cementitious material delivery system of claim 8 wherein the decoupling accumulator includes a hollow shaft connected to the piston.

10. The cementitious material delivery system of claim 9 wherein the hollow shaft has an end connected to the piston and an opposite end that functions as an accumulator inlet.

11. The cementitious material delivery system of claim 10 wherein the piston has a pushing surface and an opening within the pushing surface that has an area less than the area of the surface outlined by the pushing surface.

12. The cementitious material delivery system of claim 10 wherein the hollow shaft is attached to the piston such that cementitious material may flow from the accumulator inlet through the opening in the pushing surface of the piston.

13. The cementitious material delivery system of claim 12 wherein the cylinder includes an opening there through that is sized and positioned to allow cementitious material to escape from the cylinder only when the cylinder has been filled beyond a threshold amount.

14. The cementitious material delivery system of claim 5 wherein the decoupling accumulator includes a detection system configured to detect when the amount of cementitious material in the reservoir reaches a first amount and when it reaches a second amount.

15. The cementitious material delivery system of claim 14 further comprising a pump configured to be activated when the detection system detects that the amount of cementitious material in the reservoir has reached the first amount and to be deactivated when the detection system detects that the amount of cementitious material in the reservoir has reached the second amount.

16. The cementitious material delivery system of claim 14 wherein the detection system includes a first and second level sensor.

17. A cementitious material delivery system comprising:
a first chemical agent which cures the cementitious material at a first rate when mixed with the cementitious material;
a first mixer configured to mix the first chemical agent with a first stream of cementitious material to produce a first mixed stream of cementitious material;
a second chemical agent which cures the cementitious material at a second rate when mixed with the cementitious material which is faster than the first rate;
a second mixer configured to mix the second chemical agent with a second stream of cementitious material to product a second mixed stream of cementitious material; and
a nozzle configured to extrude the first mixed stream of cementitious material and the second mixed stream of cementitious material separate from the first mixed stream of cementitious material.

18. The cementitious material delivery system of claim 17 wherein the nozzle:
has a first, second, and third outlet which are each configured to extrude cementitious material, the second outlet being between the first and the third outlets; and
is configured such that:
the mixed stream of cementitious material is extruded from the second outlet; and
the second mixed stream of cementitious material is extruded from the first and the third outlets.

19. A cementitious material delivery system comprising:
a first stream of cementitious material mixed with a chemical agent that cures at a first rate;
a second stream of cementitious material mixed with a chemical agent that cures at a second rate which is faster than the first rate; and
a nozzle configured to extrude the first stream of cementitious material and the second stream of cementitious material separate from the first stream of cementitious material.

20. The cementitious material delivery system of claim 19 wherein:
the nozzle has a first, second, and third outlet which are each configured to extrude cementitious material, the second outlet being between the first and the third outlets; and
the nozzle is configured such that:
the first stream is extruded from the second outlet; and
the second stream is extruded from the first and the third outlets.

* * * * *